United States Patent [19]

Hampp

[11] Patent Number: 5,670,239
[45] Date of Patent: Sep. 23, 1997

[54] COMPOSITION FOR THE DELOCALIZED MARKING OF ARTICLES, ITS PREPARATION AND USE

[75] Inventor: Norbert Hampp, München, Germany

[73] Assignee: Consortium für Elektrochemische Industrie GmbH, München, Germany

[21] Appl. No.: 549,103

[22] Filed: Oct. 27, 1995

[30] Foreign Application Priority Data

Dec. 16, 1994 [DE] Germany ............ 44 45 004.4

[51] Int. Cl.$^6$ ...................................... B32B 3/00
[52] U.S. Cl. ............ 428/195; 428/206; 428/212; 428/411.1; 428/457; 428/913; 283/72
[58] Field of Search ................. 428/195, 411.1, 428/913, 914, 204, 206, 212, 457; 283/94, 72

[56] References Cited

FOREIGN PATENT DOCUMENTS

| 2556867 | 12/1983 | France. |
| 2433628 | 2/1975 | Germany. |
| 3445401 | 6/1986 | Germany. |
| 1233001 | 5/1971 | United Kingdom. |

OTHER PUBLICATIONS

Database WPI, Week 9309, Derwent Publications Ltd., AN 93–069546 & HU–B–203212.

Derwent Abstract AN 75–07503W[05] for DE–A–2433628.

Derwent Abstract AN 85–185562 [31] for FR–A–2,556,867.

Derwent Abstract for DE 3445401 AN: 86–169995.

*Primary Examiner*—William Krynski
*Attorney, Agent, or Firm*—Collard & Roe, P.C.

[57] ABSTRACT

A composition for the delocalized marking of articles, which makes the forging or improper use or exploitation of these articles difficult. It includes chemical elements having a $K_\alpha$ line of from 3.69 keV to 76.315 keV in defined distributions, the physical properties of these substances and/or their elemental and/or quantitative composition serving as delocalized information which cannot be discerned with the naked eye.

19 Claims, 3 Drawing Sheets

COMPOSITION FOR THE DELOCALIZED MARKING OF ARTICLES, ITS PREPARATION AND USE

BACKGROUND OF THE INVENTION

1. Field of the Invention

The present invention relates to a composition for the delocalized marking of articles, and to its preparation and use.

2. The Prior Art

For marking vehicles with the object of making theft or unauthorized disposal more difficult, DE-A-3,445,401 discloses the application by the manufacturer of an identification marking, which can be read by subjecting it to radiation and evaluating the reflected radiation, which is applied in such a way that it is covered by a layer of lacquer, paint or underseal which is impermeable to visible light and through which the radiation acts.

Disadvantageously, even in the case of slight damage to the vehicle, it is difficult to achieve error-free reading of the identification mark which has been applied to the vehicle in a hidden fashion, so that in this case there may be errors in interpreting the information content. Moreover, the repair of a damaged identification mark is impossible without a great deal of labor intensive effort.

SUMMARY OF THE INVENTION

It is an object of the present invention to provide a composition which enables articles to be marked such that their falsification or improper use or exploitation is made difficult, which marking avoids the above-mentioned disadvantages.

This object is achieved by a composition which comprises chemical elements having a $K_\alpha$ line of from 3.69 keV to 76.315 keV in defined distributions, the physical properties of these substances or their elemental and/or quantitative composition serving as delocalized information which cannot be discerned with the naked eye.

In the composition according to the invention, therefore, an information item, for example an encrypted numerical code or a number/letter combination, is stored in a delocalized form which cannot be discerned with the naked eye.

By means of the composition according to the invention it is possible to implement at least 100, preferably at least 10,000, and, with particular preference, at least 1,000,000 different information states.

The stored information can be read out of the coating according to the invention by means of non-invasive or minimal-invasive methods within a short time and with high reliability.

An article which has been coated by the manufacturer with a composition according to the invention can therefore be rapidly and unambiguously identified in terms of its origin in a virtually forgeproof manner.

Removal or a subsequent modification of the coating according to the invention is technologically too complex and in general bears no relation to the value of the marked article.

This level of forgeproof of security reduces the risk of theft for articles such as, for example, correspondingly coated motor vehicles. In the case of correspondingly coated aircraft components, it is possible to detect original replacement parts and thus to protect against fakes or else reused or reprocessed replacement parts. Consequently, the invention also relates to articles which are marked with the composition according to the invention.

The composition according to the invention can be applied directly to the article to be marked and may thus itself act as a coating composition, or else it can be employed as an additive to all customary coating compositions.

In a preferred embodiment, the composition according to the invention is used to dope coating compositions with substances which occur in the respective coating composition either not at all or only in very small traces, which do not impair coding, or in precisely known concentrations.

The invention therefore also relates to coating compositions which are doped with substances which occur in the respective coating composition either not at all or only in very slight traces or in precisely known concentrations, in each case in defined quantities.

Examples of coating compositions are liquid or pulverulent coating materials, resins, plastics such as plastics films, paints, glazes, enamel, glass or adhesives.

The preferred information carriers among the elements of the Periodic Table having a $K_\alpha$ line of from 3.69 keV to 76.315 keV are those for which methods of surface analysis are known by means of which methods these elements can be detected quantitatively. Such elements are, in particular, elements which are not ubiquitous.

It is particularly preferred to use elements from the subgroups or rare main group elements.

The elements are employed in elemental form or in the form of any desired compounds. They are preferably employed in the form of simple inorganic or organic compounds.

The component of the composition according to the invention which constitutes the information is preferably a mixture of substances, this mixture comprising defined chemical elements having a $K_\alpha$ line of from 3.69 keV to 76.315 keV in a number and in each case a specific quantity such that they code with a sufficient complexity, i.e. for example a number of 8 to 10 digits.

Furthermore, the information-containing components used are preferably substances which have a particular stability to aging processes and which are therefore suitable for outdoor use.

In addition, the substances employed are preferably selected such that they can be admixed into the respective coating composition used, for example a standard coating material, without problems and can be processed by means of conventional, standard processes.

The substances employed should therefore preferably be compatible with the maximum number of common coating constituents and should not have an adverse effect on the properties of the coating or coating composition. For instance, the substances should have no effect on processability, durability, especially under the effects of weathering, or compatibility with compositions used to care for the coating.

In addition, it is advantageous if the substances employed do not adversely affect the recycling of articles which have been coated with the composition according to the invention.

It is an advantage if care is taken, in addition, to make sure that the substances selected as information carriers are only those which are not already present from the outset in the respective coating composition, in the carrier material or in any pretreatment coat or covering coat which may be present.

Moreover, it is preferred not to use the substances which are present in those parts of the coating apparatus which come into contact with the composition according to the invention.

A composition according to the invention can be prepared, for example, as follows:

For example, it is compiled into a table what concentration of a selected element represents an information digit. Then stock solutions having a defined content of the element, as high as possible, of the particular compounds which contain the elements used for coding are prepared in the particular coating composition desired, for example, a paint. By adding the particular quantity desired of these stock solutions, containing the particular element desired in defined quantity, the coating composition is coded in the particular manner desired.

For evaluation, the concentration as determined by analysis is converted into numerical values with the aid of the table.

Preferably, when selecting the elements which serve for encryption of the information, care should be taken that these elements are present neither in the coating composition to be doped itself nor in the carrier material which is coated.

If defined compounds are used as information carriers instead of defined elements of the Periodic Table, an analogous procedure is followed.

The composition according to the invention is applied completely or partially to the article to be marked, using known coating processes. This is generally carried out in the same way as that in which the article has been coated hitherto. Examples of such processes are spraying, dipping, brushing, enameling, printing, sticking, sputtering or vapor deposition.

Even after application to the article to be marked, the information stored in the composition according to the invention can be rapidly detected even in cases of high complexity. The information can, moreover, be read out nondestructively, since even on repeated detection of the information there is no change discernible with the naked eye to the surface of the marked article.

Suitable methods for detecting the information are those methods of chemical or physical surface analysis which enable the detection of individual elements in mixtures and any chemical compounds, and which require no material sampling, or sampling which is so slight that the site of sampling is thereafter not discernible with the naked eye.

Examples of such methods are atomic absorption (AAS), ion chromatography (ICP), emission spectroscopy, particle-induced X-ray emission (PIXE), laser-induced secondary ion mass spectroscopy (LSIMS), X-ray fluorescense analysis (XRFA), total reflection X-ray fluorescence analysis (TXRFA), kinetic X-ray fluorescense and total reflection X-ray fluorescence.

It is preferred to employ particle-induced X-ray emission (PIXE), laser-induced secondary ion mass spectroscopy (LSIMS), X-ray fluorescence analysis (XRFA), total reflection X-ray fluorescence analysis (TXRFA), kinetic X-ray fluorescence and total reflection X-ray fluorescence.

Particular preference is given to X-ray fluorescence analysis (XRFA), total reflection X-ray fluorescence analysis (TXRFA), kinetic X-ray fluorescence and total reflection X-ray fluorescence.

In the X-ray methods, the coded information is determined by analyzing the internal electron shells of the elements. The advantage of this method of detection is that chemical alteration of the elements as a consequence of their chemical bonds in the compound employed does not lead to any change in the information detected, since the inner electron shells do not participate in chemical bonding.

Even in simple embodiments, i.e., the measurement of the X-ray fluorescence after excitation with one radiation wavelength, an observation window of 15 keV is attained. Since the width of a line is less than 0.5 keV, it is evident that a large number of information positions are available. In this context, each information position corresponds to a chemical element. At each individual information position it is possible, based on the different concentrations in the elements, which are measured in the form of different gray values, to store graded information. Even with the above-metnioned observation window, there are thus in theory up to 30 positions available for information storage. In this embodiment, therefore, it would be possible to encrypt a number of up to 30 digits.

The information can be coded, for example, in such a way that a specific element or a specific chemical compound represents a specific digit or multi-digit number or of a letter/number combination. The concentration of the element or of the chemical compound may in this case express the value of the figure or the letter. If a specific element or a specific chemical compound which belongs to the coding set is absent from the composition, then this compound corresponds to the value zero.

The composition according to the invention is suitable in principle for the marking of any desired articles. Thus it is possible, using the composition according to the invention, to mark articles such as, for example, motor vehicles, original and replacement parts in the automative or aeroindustries, documents, securities, stamping inks, seals, weapons, checks, credit cards or articles of value such as, for example, art objects of any kind.

The invention therefore also relates to the above-mentioned articles insofar as they are marked with a composition according to the invention.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the several views.

Other objects and features of the present invention will become apparent from the following Examples, which disclose the embodiments of the present invention. It should be understood, however, that the Examples are designed for the purpose of illustration only and not as a definition of the limits of the invention.

EXAMPLE 1

Preparation of a Coating Material According to the Invention Which Carries the Number 443358A43 as Coded Information. The Letter "A" is Equivalent to the Numerical Value 10

Stock solutions with a maximum content of one metal each were prepared. For this purpose, acetylacetonates of the elements Ga, Cu, Ni, Sc, Y, Eu, Ho, Nd, and rubidium acetate, were dissolved in each case individually with stirring in an acrylate clearcoat FF 76-0122 11 available under the designation 1K High-Solid-Klarlack farblos from BASF L.+F. AG, 48136 Munster. Limited by the variable solubility, the content of each element was between 700 and 1,000 ppm.

These stock solutions were analyzed for their metal contents by means of atomic absorption spectroscopy. The proportion by mass of volatile solvents was 50%. From this it follows that the metal concentration of the coat doubles on drying.

In order to carry out coding, a coding table was compiled which first of all assigns to each element that position in the number which is to be coded, and which secondly lays down what concentration of the respective element corresponds to one digit in the allocated position. It was chosen to arrange the elements in accordance with their lines which are visible in the X-ray fluorescence spectrum, i.e. the highest-value position corresponds to scandium (Sc) and the lowest-value position corresponds to yttrium (Y). For the elements scandium (Sc), neodymium (Nd), europium (Eu) and holmium (HO) 100 ppm per digit was chosen in each case, while for the remaining elements 10 ppm per digit was the figure set.

For mixing 1 kg of the desired coating material, the individual stock solutions are weighed out in the quantities calculated in Table 1 and made up to 1 kg with clearcoat.

The ready-mixed coded coating material was diluted with 20% solvent in order to improve its processing properties and applied using a spray gun, in a thin, homogeneous layer, to metal panels having a surface area of 20×25 cm. The metal panels already had a phosphating coat (25 µm) and a primer-surface coat (75–85 µm). Prior to spraying they were cleaned with ethanol. After spraying, the panels were dried in a drying oven at 80° C. for 1 h and then at 130° C. for 30 min.

EXAMPLE 2

Reading out the Coded Information from a Coded Panel

Figure 1:
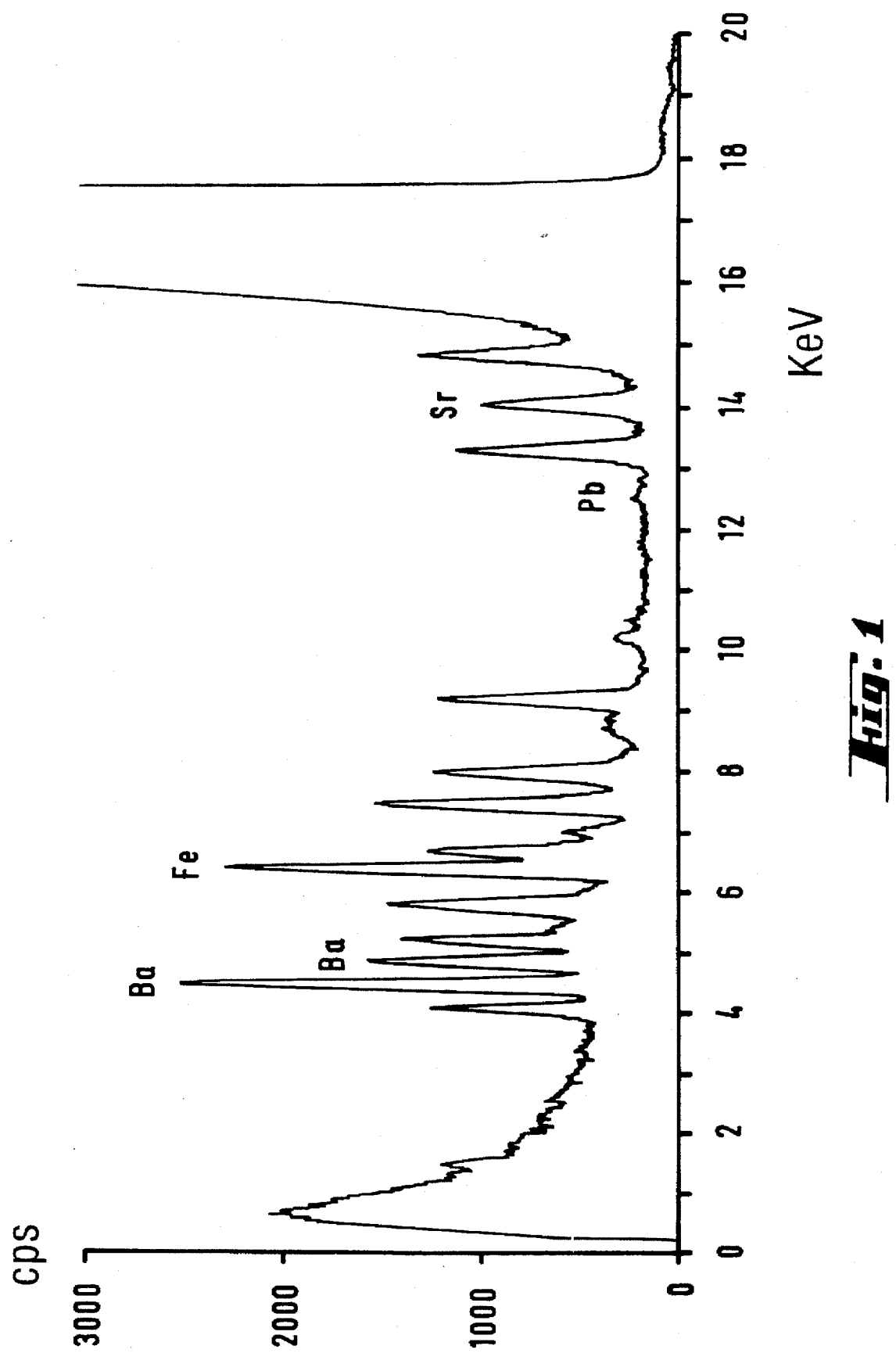
FIG. 1 shows the total reflection spectrum of a metal panel coated with the coating mixture of Example 1. The peaks marked with the symbols for their element (Ba, Fe, Sr, Pb) have not been employed for coding but are inherent constituents of the coating base material.

The non-destructive analysis of the panel coated in accordance with Example 1 was carried out by total reflection X-ray fluorescence analysis (TXRFA) using a TRF spectrometer model TXRF 8010 from AtomikaInstruments GmbH (85764 Oberschleißheim) (FIG. 1).

Figure 2:
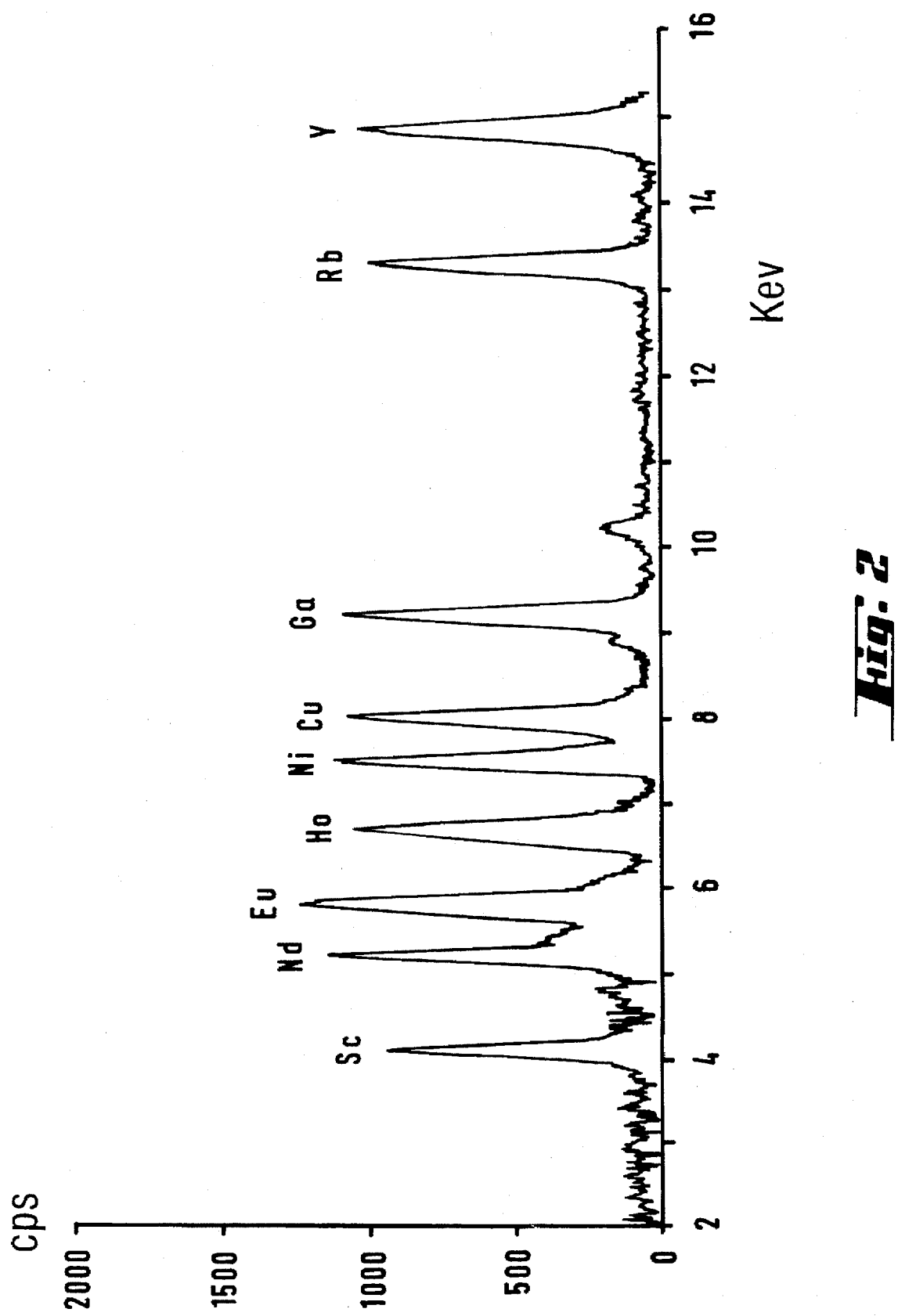
FIG. 2 is obtained from FIG. 1 if the non-coding peaks are removed from the spectrum and the background is subtracted. The individual elements are marked with their chemical symbols. The data obtained from this spectrum are used for evaluation.

In order to evaluate the spectrum, the proportion of scatter was numerically subtracted. In addition, the peaks of those elements which were not added for coding purposes (Fe, Ba, Sr) were removed by subtraction of appropriately adapted Gaussian curves from the spectra. This operation gives FIG. 2. The widths of the peaks at half peak height were uniformly 0.22 keV, irrespective of the particular element. Therefore, both the peak heights and the peak areas can be used in order to determine the concentration.

From the height of the coding element peaks, measured in cps (counts per second) and their uniform half-value width of 0.22 keV, the areas of the coding element peaks were calculated. For each element, an independent determination was made of the sensitivity factor, which depends on the matrix used, i.e., in this case the coating base of the clearcoat, and the factors specific to the instrument, e.g. X-ray excitation tubes and detector characteristics. Multiplication of the areas of the element peaks thus gives the concentration of the individual elements which can be detected in the coating. If this is applied in turn to the coding table which was used in the course of preparation (see Example 1), numbers are produced which when rounded to their integral value, give the coded information. This procedure is represented in Table 2.

TABLE 1

| Allocation of the elements to the positions of the number to be coded | Sc | Nd | Eu | Ho | Ni | Cu | Ga | Rb | Y |
| --- | --- | --- | --- | --- | --- | --- | --- | --- | --- |
| Conc. stock solution (ppm) measured by AAS | 895 | 863 | 733 | 986 | 930 | 1,000 | 936 | 1,000 | 988 |
| Coding concentration (ppm/digit) based on dry coating | 100 | 100 | 100 | 100 | 10 | 10 | 10 | 10 | 10 |
| Proportion by mass of solvent | 0.5 | 0.5 | 0.5 | 0.5 | 0.5 | 0.5 | 0.5 | 0.5 | 0.5 |
| Number to be coded | 4 | 4 | 3 | 3 | 5 | 8 | 10 | 4 | 3 |
| Quantity to be metered in, in grams per kg of liquid coating material (g) | 223.46 | 231.75 | 204.64 | 155.28 | 26.88 | 40.00 | 53.42 | 20.00 | 15.18 |

Sum of all doped quantities of coating material: 970.61 g. 23.39 g of clearcoat must therefore be used to make up the batch to 1 kg of coded coating material.

TABLE 2

|  | Sc | Nd | Eu | Ho | Ni | Cu | Ga | Rb | Y |
|---|---|---|---|---|---|---|---|---|---|
| Height of the element peak (cps) | 902 | 1097 | 1,195 | 1,024 | 1,023 | 1,068 | 1,048 | 975 | 1,000 |
| Half-value width of the element peak (keV) | 0.22 | 0.22 | 0.22 | 0.22 | 0.22 | 0.22 | 0.22 | 0.22 | 0.22 |
| Area of the element peak (cps * keV) | 198.44 | 241.34 | 262.9 | 225.28 | 225.06 | 234.96 | 230.56 | 214.5 | 220 |
| Matrix-dependent sensitivity factor (ppm/area) | 2.110 | 1.820 | 1.040 | 1.360 | 0.230 | 0.330 | 0.435 | 0.180 | 0.135 |
| Measured concentration (ppm) | 418.71 | 439.24 | 273.42 | 306.38 | 51.76 | 77.54 | 100.29 | 38.61 | 29.70 |
| Coding concentration (ppm/digit) based on dry coating | 100 | 100 | 100 | 100 | 10 | 10 | 10 | 10 | 10 |
| Decoded number | 4.187 | 4.392 | 2.73 | 3.063 | 5.176 | 7.753 | 10.036 | 3.861 | 2.97 |
| Decoded number, rounded | 4 | 4 | 3 | 3 | 5 | 8 | 10 | 4 | 3 |

EXAMPLE 3

Variability of the Coding Tables as Additional Security Feature

In Tables 1 and 2, one possible coding/decoding table was employed. A coding table contains the following information:

1. Number of elements and/or number of positions of the coded information;

2. Allocation of the elements to the positions of the number to be coded; and

3. The concentration grading employed (ppm/digit).

All three items of information must in addition be known for a potential misuse, i.e. in order to get around or to forge the security system. Since these items of information are preferably dealt with separately from the coating compositions according to the invention, this provides an additional security element.

Table 3 shows how the evaluation of the spectrum in Example 2 (see also FIG. 1 and FIG. 2) using a different coding table leads to a very different result.

The coding table differs from that of Example 2, in that, firstly, the chosen allocation of the elements to the individual positions of the coded information is different (alphabetic in this case) and, secondly, the concentration grading used in the individual positions (ppm/digit) is different.

TABLE 3

|  | Cu | Eu | Ga | Ho | Nd | Ni | Rb | Sc | Y |
|---|---|---|---|---|---|---|---|---|---|
| Height of the element peak (cps) | 1,068 | 1,195 | 1,048 | 1,024 | 1,097 | 1,023 | 975 | 902 | 1,000 |
| Half-value width of the element peak (keV) | 0.22 | 0.22 | 0.22 | 0.22 | 0.22 | 0.22 | 0.22 | 0.22 | 0.22 |
| Area of the element peak (cps * keV) | 234.96 | 262.9 | 230.56 | 225.28 | 241.34 | 225.06 | 214.5 | 198.44 | 220 |
| Matrix-dependent sensitivity factor (ppm/area) | 0.330 | 1.040 | 0.435 | 1.360 | 1.820 | 0.230 | 0.180 | 2.110 | 0.135 |
| Measured concentration (ppm) | 77.54 | 273.42 | 100.29 | 306.38 | 439.24 | 51.76 | 38.61 | 418.71 | 29.70 |
| Coding concentration (ppm/digit) based on dry coating | 15 | 150 | 20 | 80 | 150 | 25 | 20 | 200 | 10 |
| Decoded number | 5.169 | 1.823 | 5.015 | 3.830 | 2.928 | 2.071 | 1.931 | 2.094 | 2.970 |
| Decoded number, rounded | 5 | 2 | 5 | 4 | 3 | 2 | 2 | 2 | 3 |

The result of the evaluation in this case is the number 525432223.

EXAMPLE 4

Coding of a Different Information Item

Figure 3:
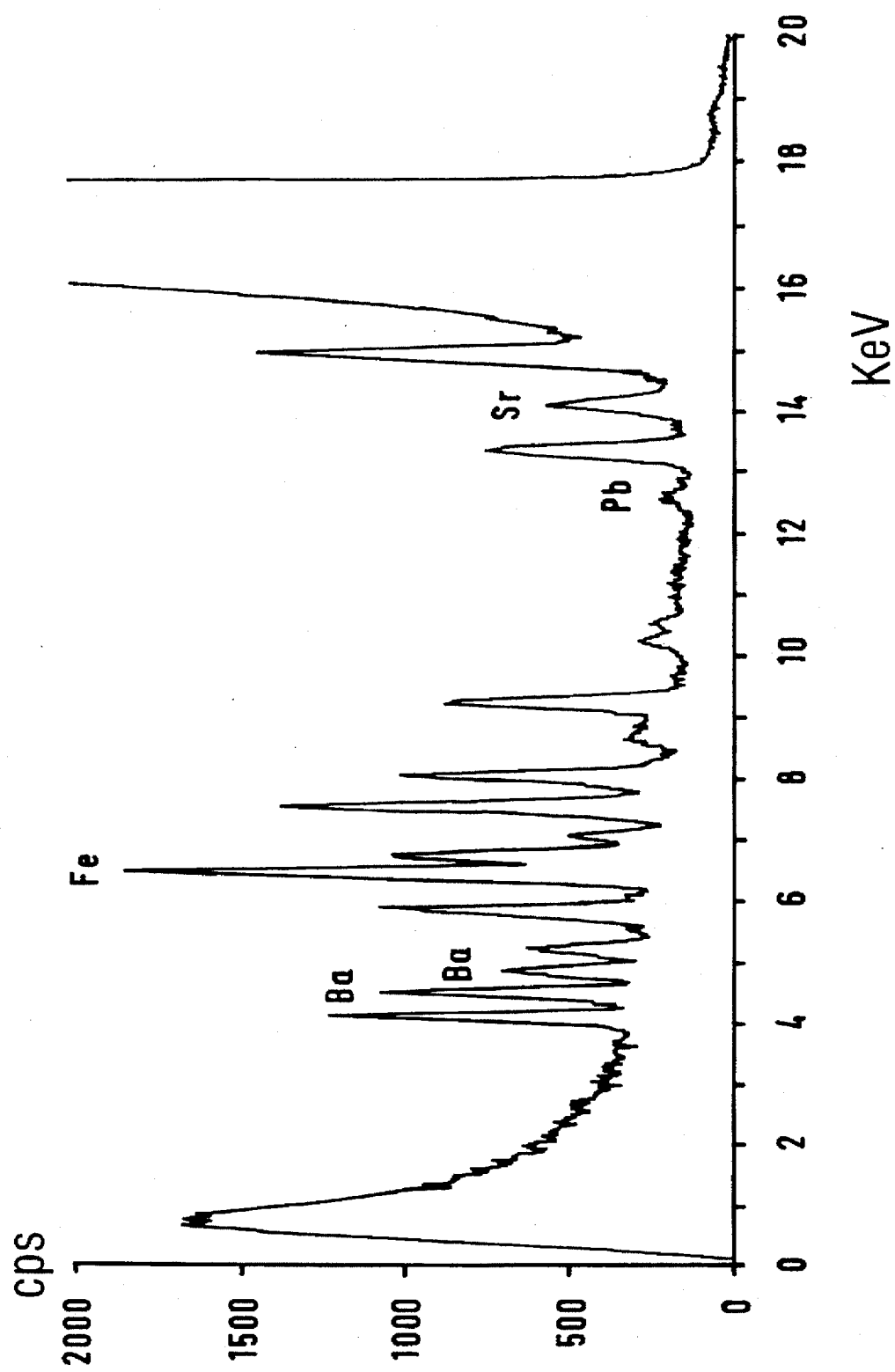
FIG. 3 shows the total reflection spectrum of a metal panel coated in accordance with Example 4.

FIG. 3 shows a total reflection X-ray spectrum which comprises the same elements as in Example 2. As in Example 1, the number 314313123 was encrypted. The information was determined as in Example 2. The respective coding/decoding table can be seen from Table 4.

TABLE 4

|  | Cu | Eu | Ga | Ho | Nd | Ni | Rb | Sc | Y |
|---|---|---|---|---|---|---|---|---|---|
| Height of the element peak (cps) | 823 | 720 | 779 | 779 | 309 | 1,154 | 676 | 897 | 1,147 |
| Half-value width of the element peak (keV) | 0.22 | 0.22 | 0.22 | 0.22 | 0.22 | 0.22 | 0.22 | 0.22 | 0.22 |
| Area of the element peak (cps * keV) | 181.06 | 158.4 | 171.38 | 171.38 | 67.98 | 253.88 | 148.72 | 197.34 | 252.34 |
| Matrix-dependent sensitivity factor (ppm/area) | 0.330 | 1.040 | 0.435 | 1.360 | 1.820 | 0.230 | 0.180 | 2.110 | 0.135 |
| Measured concentration (ppm) | 59.75 | 164.74 | 74.55 | 233.08 | 124.72 | 58.39 | 26.77 | 416.39 | 34.07 |
| Coding concentration (ppm/digit) based on dry coating | 20 | 150 | 20 | 80 | 150 | 20 | 25 | 200 | 10 |
| Decoded number | 2.987 | 1.098 | 3.728 | 2.913 | 0.825 | 2.920 | 1.071 | 2.082 | 3.407 |
| Decoded number, rounded | 3 | 1 | 4 | 3 | 1 | 3 | 1 | 2 | 3 |

The result of the evaluation in this case is the number 314313123.

While several embodiments of the present invention have been shown and described, it is to be understood that many changes and modifications may be made thereunto without departing from the spirit and scope of the invention as defined in the appended claims.

What is claimed is:

1. A composition which enables marking of articles which makes the forging or improper use or exploitation of these articles difficult, said composition comprising a mixture of chemical elements having a $K_\alpha$ line of from 3.69 keV to 76.315 keV wherein the amounts of the different elements represent an encrypted numerical code, the physical properties of said chemical elements serving as delocalized information which cannot be discerned with a naked eye of an observer of the article.

2. A composition as claimed in claim 1, wherein compounds containing the chemical elements having a $k_\alpha$ line from 3.69 keV to 76.315 keV are those which have a stability to aging processes and which are therefore suitable for outdoor use.

3. A composition as claimed in claim 1, which enables implementation of at least 100 different delocalized information.

4. A composition as claimed in claim 1, which enables implementation of at least 10,000 different delocalized information.

5. A composition as claimed in claim 1, which permits the delocalized information to be read out by noninvasive or minimal-invasive methods.

6. A composition as claimed in claim 1, wherein the elements selected are not already present from the outset in the composition.

7. A process for the preparation of a composition which enables marking of articles which makes the forging or improper use or exploitation of these articles difficult, said composition comprising a mixture of chemical elements having a $K_\alpha$ line of from 3.69 keV to 76.315 keV wherein the amounts of the different elements represent an encrypted numerical code.

the physical properties of said chemical elements serving as delocalized information which cannot be discerned with a naked eye of an observer of the article;

said process comprising the steps of:

preparing stock solutions with each stock solution having a defined content of one chemical element or of a compound which contains the chemical element provided for the coding; and mixing the stock solutions in quantities sufficient to create a coded coating composition.

8. An article which is marked with at least one composition as claimed in claim 1.

9. In a method for using a composition for the marking of motor vehicles, the improvement which comprises utilizing the composition as claimed in claim 1 for said marking.

10. In a method for using a composition for the marking of original or replacement parts in the automobile or aero industries, the improvement which comprises utilizing the composition as claimed in claim 1 for said marking.

11. In a method for using a composition for the marking of documents, the improvement which comprises utilizing the composition as claimed in claim 1 for said marking.

12. In a method for using a composition for the marking of securities, the improvement which comprises utilizing the composition as claimed in claim 1 for said marking.

13. In a method for using a composition for the marking of stamping inks, the improvement which comprises utilizing the composition as claimed in claim 1 for said marking.

14. In a method for using a composition for the marking of seals, the improvement which comprises utilizing the composition as claimed in claim 1 for said marking.

15. In a method for using a composition for the marking of weapons, the improvement which comprises utilizing the composition as claimed in claim 1 for said marking.

16. In a method for using a composition for the marking of checks, the improvement which comprises utilizing the composition as claimed in claim 1 for said marking.

17. In a method for using a composition for the marking of credit cards, the improvement which comprises
utilizing the composition as claimed in claim 1 for said marking.

18. In a method for using a composition for the marking of articles of value,
the improvement which comprises
utilizing the composition as claimed in claim 1 for said marking.

19. In a method for using a composition for the marking of art objects,
the improvement which comprises
utilizing the composition as claimed in claim 1 for said marking.

* * * * *